Patented Aug. 28, 1951

2,565,538

UNITED STATES PATENT OFFICE 2,565,538

SPECIAL PURPOSE SYNTHETIC RESIN MIXTURE AND METHOD OF MAKING THE SAME

Arthur R. Welch and Oliver G. Morris, Hoquiam, Wash.; said Morris assignor to said Welch No Drawing. Application October 20, 1947, Serial No. 781,012

9 Claims. (Cl. 260—44)

The present invention relates to a special purpose synthetic resin mixture and to methods of preparing the same. In the prior application of Welch, Serial No. 772,964, filed September 9, 1947, there is described an improved method of and apparatus for patching veneer plies. In accordance with that method, discrete wood particles, such as sanderdust or sawdust, are mixed with an aqueous synthetic resin solution, to produce the patching material. As there explained, the mixture of wood particles and synthetic resin should be relatively dry to the touch, but should have the capability of being readily compacted in the hand so as to retain the shape imparted thereto. This is important, so that the mixture can be placed in a plurality of knotholes and other defects in the veneer plies, and compacted therein by hand with sufficient adherence to the margins of the holes to enable the sheet to be shifted to a hot press, for initial setting of the resin component of the mixture, in a reasonably short time, such as 10 seconds.

This initial setting must solidify the patching material sufficiently to enable the patched ply to be handled in the same manner as a sound veneer sheet, having no defects or patches therein. For instance, the veneer sheet must be capable of going through the normal plywood assembly steps, glue spreaders, press loaders and the like, without dislodgment of the patches.

The present invention provides a method of making a mixture of synthetic resins which, when mixed with wood particles, is admirably suited for use in the patching procedure described in the above mentioned application.

The primary object of the invention is to provide a mixture of synthetic resins which will have the characteristics desired for use in such a method.

Another object of the invention is to provide a method of compounding a mixture of special synthetic resins and a resulting product which may be readily mixed with wood particles, such as fine sawdust or sanderdust; which will give the final wood-resin mixture the desired degree of plasticity, which can be readily compressed by manual pressure into knotholes and the like; which will adhere to the knotholes sufficiently for insertion into a hot press; which will set up and harden in a minimum of time under heat and pressure; and which will not readily become dislodged in the plywood panel assembly procedure.

An alkaline catalyzed, equimolar phenol-formaldehyde resin, described in the application of Welch, Serial No. 707,766, now abandoned, fulfills all these requirements with the exception of the rapidity of cure or set. The resin described below is a modification of and improvement upon this original resin, and the cure time required is one-quarter of the original cure time, all other qualities remaining essentially equal.

It is possible to increase the rate of cure of a phenolic resin by making it strongly acid. To have done this with the original Welch resin, such a low pH would be necessary that the boil resistance of the finished material would be adversely affected. A phenol resin may be modified by the addition of a more rapid reacting resin forming material to increase the cure rate. To have used this procedure alone would have been expensive, comparatively.

A combination of the two alternatives is most satisfactory. Melamine is the least expensive modifying material which gives a satisfactory curing rate increase, without affecting the storage life adversely nor lowering the ultimate boil resistance. Also, it does not decrease the aqueous solubility of the resin solution, which is important in securing an even mixture of wood particles and resin, with the required degree of compactibility.

The melamine modified resin is prepared by adding 4 parts by weight of 37% formaldehyde to 2 parts of powdered melamine, adjusting the pH to 8.0 with 10% NaOH solution, warming to incipient clearness, and adding immediately 8 parts by weight of the phenol resin solution. The whole is brought to a boil for 5 minutes, then positively cooled to 70° F. or room temperature. It may now be kept in a covered container for several weeks and is ready for use.

The acid catalyst which activates the melamine modified phenol resin, is added immediately prior to the mixing of the resin solution into the wood particles. The catalyst preferably is an unmodified or straight tridimensional alkyd, such as produced by partially reacting ⅔ parts by weight of phthalic anhydride with ⅓ part of glycerin. The reaction should be carried to such a point by heating, that a clear solution is obtained which does not turn cloudy upon cooling, but no gelation should occur.

If desired, however, a bi-dimensional, partially reacted alkyd resin may be used as the catalyst, such as is produced by reacting ethylene glycol with maleic anhydride or phthalic anhydride in equal parts, as set forth below in Examples III and IV.

The effectiveness of the catalyst depends upon the unreacted acid anhydride, which should cause a pH of about 4.0 to result when the above prepared amounts of melamine modified phenol resin and partially reacted alkyd resin are mixed together. If the alkyd is diluted with its own volume of commercial ethyl alcohol or equivalent solvent, the mixing of the resin and catalyst is hastened.

Immediately after the resin solution is activated with the catalyst, it should be mixed into the wood particles, since the resin will begin to gel after 30 minutes at room temperature.

The melamine modified phenol resin may be kept for several weeks or longer, before addition of the catalyst. The alkyd catalyst may also be kept the same length of time before addition to the resin.

The melamine may be extended or diluted, by replacement with an equivalent amount of urea, in the preparation of the modified phenol resin. Urea, however, is slower curing, requires a greater degree of acidity to produce an equal catalytic effect, and is less boil resistant than a pure melamine. Urea is considerably less expensive than melamine. Thiourea is not so satisfactory, having a slower cure rate.

Formaldehyde is by far the most satisfactory aldehyde.

There are several satisfactory alternate materials for production of the alkyd catalyst. It is desirable, though not necessary, that the catalyst be heat convertible to a final solid state. This assures ultimate reaction of the excess acid, or unreacted acid, to produce a substantially neutral product.

Ethylene glycol may be substituted for part or all of the glycerin, and maleic anhydride for all or part of the phthalic anhydride, providing proper adjustment is made to compensate for the varying molecular weights, reactivity, reagent purity, etc.

The acid or acid anhydride must be sufficiently water soluble, and have a high enough ionization constant to produce the required pH in the catalyzed resin.

The use of a partially reacted straight alkyd resin, as the catalyst, is thought to be unique and highly desirable, in that the necessary degree of acidity is obtained to cause rapid curing of the melamine modified phenolic resin, without leaving an undesirable acid residue in the cured resin. The unreacted portion of the acid anhydride, under conditions present in production of plywood, will react further with the glycerin to produce neutral esters. It is highly advantageous to thus eliminate undesirable acidity which otherwise lowers the water resistance of a cured resin.

The final reaction of the unreacted acid anhydride does not occur rapidly enough to lessen the catalytic effect.

The following examples are given, to show the method of making the component resins and the resulting products.

*Example I*

Two parts by weight of powdered melamine are mixed into 4 parts of a 37% formaldehyde solution, of substantially 8.0 pH. The mixture should be stirred with only slight warming, care being exercised not to exceed 80° C. The stirring is continued until the solution clears and the melamine is dissolved, which takes about five minutes or slightly longer.

8 parts of an alkaline catalyzed phenol formaldehyde resin, made in accordance with the prior application of Welch, Serial No. 707,766, filed November 4, 1946, are poured into the melamine-formaldehyde solution described above as soon as the latter is clear and while it is still warm. The mixture is stirred until clear, with continued warming up to 100° C. for not to exceed 5 minutes of warming and 5 minutes at 100° C. The solution is then positively cooled and can be stored indefinitely, until used. The combined solution should have a pH of substantially 8.0 when cool.

The phenol formaldehyde resin referred to above, and as described in the Welch application Serial No. 707,766 is made as follows:

Equal parts by mols of phenol and formaldehyde are thoroughly mixed in a suitable vessel with a relatively small amount of catalyst, such as caustic soda, and temperature of the mixture raised to substantially 180° F. by slowly heating for 30 to 40 minutes, after which time the reaction starts and the application of further heat is discontinued, permitting the reaction to continue at atmospheric pressure under the exothermic heat of the reaction alone. The reaction, with continuous stirring, continues for about 40 minutes at which time bubbling stops and the resin is then positively cooled in order to stop the reaction and to prevent further condensation.

As stated above, substantially 8 parts of the phenol formaldehyde resin solution so produced is mixed with 6 parts of the melamine-formaldehyde resin to make the first combined resin solution.

The second resin solution employed as a catalyst in the melamine modified phenolic resin of the present invention is made by warming ⅓ part of glycerin (90%) and adding thereto, ⅔ parts of phthalic anhydride. The heating is continued until the solution becomes clear, care being taken not to boil. Five minutes after the solution clears it is allowed to cool and may be kept until it is to be used.

When the resin is to be used, an equal amount of ethyl alcohol should be added to the second solution or catalyst and stirred until a smooth consistency is reached. 14 parts of the first solution and 1 part of the catalyst, dissolved in one part of ethyl alcohol are mixed together and stirred until thoroughly blended. As noted below, the mixtures so produced may be mixed with wood particles to produce the patching compound.

*Example II*

Substitute for part of the melamine in the first component resin of the first combined solution, an equivalent amount of urea mixed in a 1 to 2 ratio with the formaldehyde solution, and proceed as previously described.

*Example III*

For the first combined resin solution, use any one of the combinations described in Examples I and II, and, in the second solution or catalyst, substitute ethylene glycol for the glycerin, mixing the same with the phthalic anhydride in equal parts.

*Example IV*

Proceed as in any of Examples I–III, except substitute maleic anhydride for all or a part of the phthalic anhydride, mixing the same with the glycerin or the ethylene glycol in equal parts.

Thus, in the first combined solution, the first component consists of a resin of the class including melamine, urea and thiourea, reacted with formaldehyde. Other aldehydes have not proved satisfactory.

The alkyd resin of the second solution or catalyst may be varied by the use in part of other polybasic anhydrides, such as maleic anhydride and other polyhydric alcohols, such as ethylene glycol, so long as the mol proportions are maintained and the degree of reaction is kept sufficiently low to provide proper pH in the final resin.

The melamine modified phenolic resin, as prepared above, fulfills exacting requirements. It may be prepared in quantity, shipped and stored, prior to the addition of the catalyst solution for periods up to several months, at ordinary temperatures. Moreover, the two solutions are readily mixed together, without special equipment.

The catalyzed resin is readily and easily mixed with wood particles, such as sawdust and sanderdust and has fairly rapid impregnating ability, considering its high solid resin content, yet leaves a substantial proportion on the surfaces of the wood particles to effect adherence between the latter when compacted.

Preferably, the resin solution, combined with the catalyst, is mixed with the wood particles in proportions ranging between 2½ parts by weight to 10 parts of wood, at the lower limit, to 10 parts by weight of resin to 10 parts of wood at the upper limit. The preferred proportions are 5 parts of resin to 10 of wood. It has been found that this resin-wood mixture keeps well after mixing and can be used with completely satisfactory results up to three days after mixing.

This catalyzed resin, when added to wood particles in the proportions specified gives the exact degree of plasticity desired, producing a free flowing mass, dry to the touch, siftable through a 20 mesh screen, yet capable of being squeezed in the hand to form cohesive masses which can be fitted into knotholes and the like in veneer sheets easily and rapidly, and which will adhere to the edges of the holes sufficiently firmly to make it possible to shift a large sheet of veneer with several patches therein, into a hot press without the masses becoming dislodged.

The patching material so produced, when manually compressed in knotholes and the like may be cured and set in 15 seconds or less in the hot press. After this initial setting, the veneer sheets may be handled in the same manner as sound veneer sheets, and may be piled, sawed, run through glue spreaders and laid up with other plies to make plywood panel assemblies, without dislodgment of the patches. The preliminarily cured patches adhere well to knotholes having highly resinous or pitchy rings or seams.

Moreover, the patches produced with the resin of the present invention adhere well to the standard glues used in the manufacture of plywood, such as heat setting synthetic resins. Although the patches feel hard and rigid after the initial, preliminary hot pressing operation, the polymerization or setting is not completed until the final pressing in the plywood hot-press. During the latter operation, it is thought that the patch material is softened somewhat by the applied heat, and that under the pressure of the press, it flows and conforms to the surface configuration of the adjacent veneer ply, thereby improving the adhesive bond between the two. After final conversion of the patched material in the plywood hot press, the patches become an integral part of the panel and will withstand boiling, without softening or dislodgment.

The invention includes all modifications described above and set forth in the accompanying claims, as well as equivalents thereof.

We claim:

1. A synthetic resin material consisting essentially of a mixture of the following ingredients in the proportions indicated: (a) The reaction product of 2 parts of a material selected from the group consisting of melamine and urea with 4 parts of a 37% formaldehyde solution; (b) 8 parts of the reaction product of equal mols of phenol and formaldehyde, and (c) 1 part of a resin catalyst consisting of the reaction product resulting from the partial condensation of an anhydride from the group consisting of phthalic anhydride and maleic anhydride and a hydroxy compound from the group consisting of ethylene glycol and glycerin in proportions of between 1 and 2 parts of the anhydride to each part of the hydroxy compound.

2. A synthetic resin material in accordance with claim 1 characterized in that the resin catalyst solution consists of ⅔ parts of phthalic anhydride and ⅓ part of glycerin (90%).

3. A synthetic resin material in accordance with claim 1 characterized in that the resin catalyst solution consists of equal parts of phthalic anhydride and ethylene glycol.

4. A synthetic resin material in accordance with claim 1 characterized in that the resin catalyst solution consists of equal parts of maleic anhydride and glycerin.

5. The method of making a synthetic resin material, for use as a heat settable binder for discrete wood particles, comprising preparing a combined resin solution by dissolving substantially 2 parts of a substance consisting largely of melamine, in substantially 4 parts by weight of a 37% formaldehyde solution at a temperature below 80° C., then adding thereto substantially 8 parts of an alkaline catalyzed, aqueous phenol formaldehyde resin solution, stirring the mixture for substantially 5 minutes while gradually raising its temperature to substantially 100° C. and for substantially 5 minutes at 100° C., and then cooling the combined solution so produced; preparing a resin catalyst solution by adding to ⅓ part of a substance selected from the group consisting of glycerin and ethylene glycol, ⅔ parts of an anhydride selected from the group consisting of phthalic anhydride and maleic anhydride; adding to one part of the resin catalyst solution an equal amount of commercial ethyl alcohol, and finally mixing the solutions in proportions of substantially 14 parts of the first to 1 part of the catalyst.

6. The method of making a synthetic resin material, for use as a heat settable binder for discrete wood particles, which comprises preparing a combined resin solution by dissolving substantially 2 parts of powdered melamine in substantially 4 parts by weight of a 37% formaldehyde solution at a temperature below 80° C., then adding thereto substantially 8 parts of an alkaline catalyzed aqueous phenol formaldehyde resin solution, stirring the mixture for substantially 5 minutes while gradually raising its temperature to substantially 100° C. and maintaining its temperature at 100° C. for substantially 5 minutes, and then positively cooling the first combined resin solution so produced; preparing a resin catalyst solution by adding to ⅓ part of warmed glycerin, ⅔ parts of phthalic anhydride, and finally mixing the first and second solutions in proportions of substantially 14 to 1.

7. A method in accordance with claim 5 characterized in that urea is substituted for part of the melamine in the first component of the combined resin solution.

8. A method in accordance with claim 6, characterized in that in the resin catalyst solution, ethylene glycol is substituted for the glycerin.

9. A method in accordance with claim 8 characterized in that maleic anhydride is substituted for the phthalic anhydride in the resin catalyst solution.

ARTHUR R. WELCH.
OLIVER G. MORRIS.

REFERENCES CITED

The following references are of record in the file of this patent:

UNITED STATES PATENTS

| Number | Name | Date |
| --- | --- | --- |
| 2,016,198 | Howald | Oct. 1, 1935 |
| 2,197,357 | Widmer et al. | Apr. 16, 1940 |
| 2,315,400 | D'Alelio | Mar. 30, 1943 |
| 2,323,333 | Kauth | July 6, 1943 |
| 2,471,396 | Light | May 24, 1949 |